UNITED STATES PATENT OFFICE.

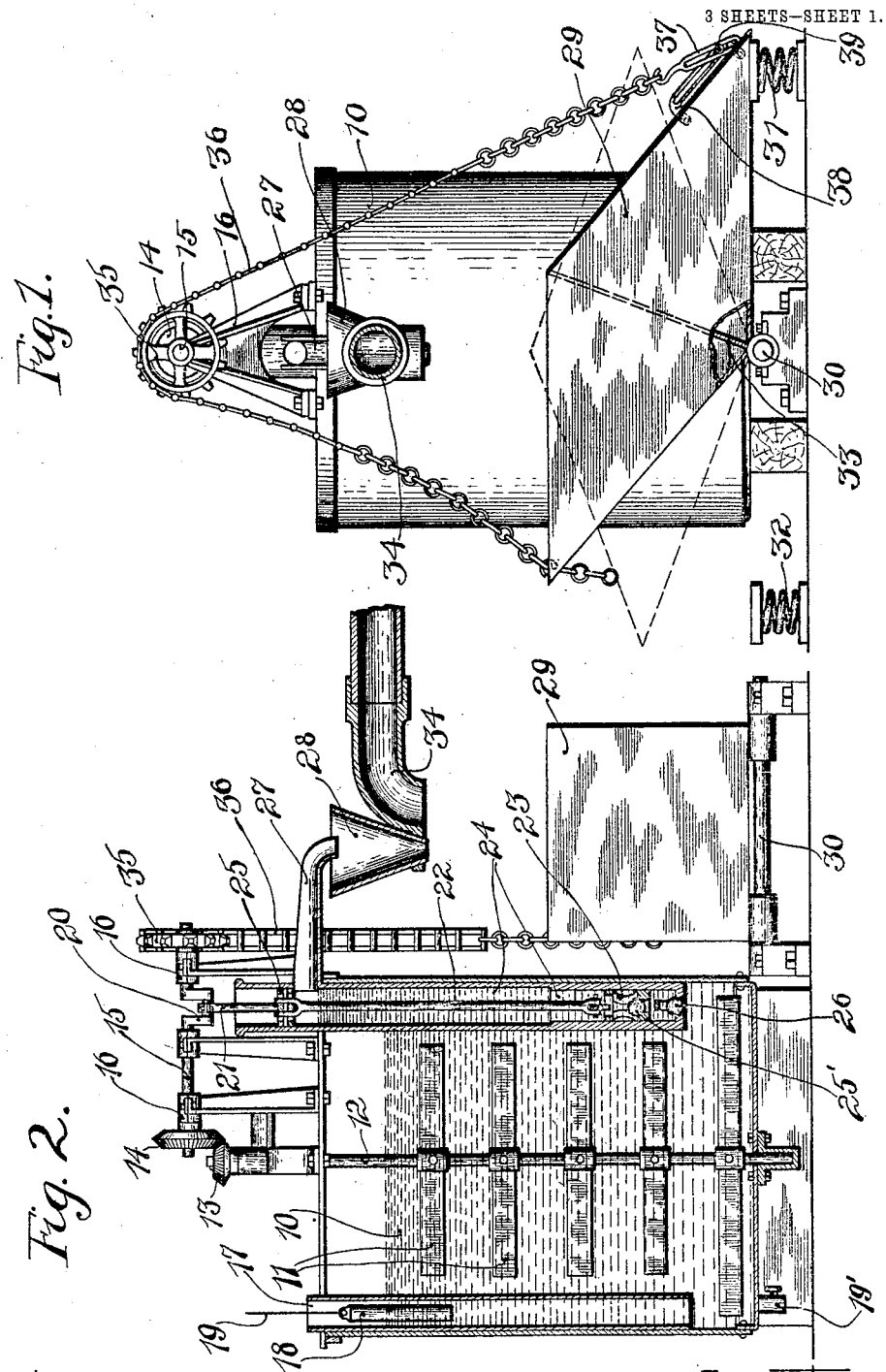

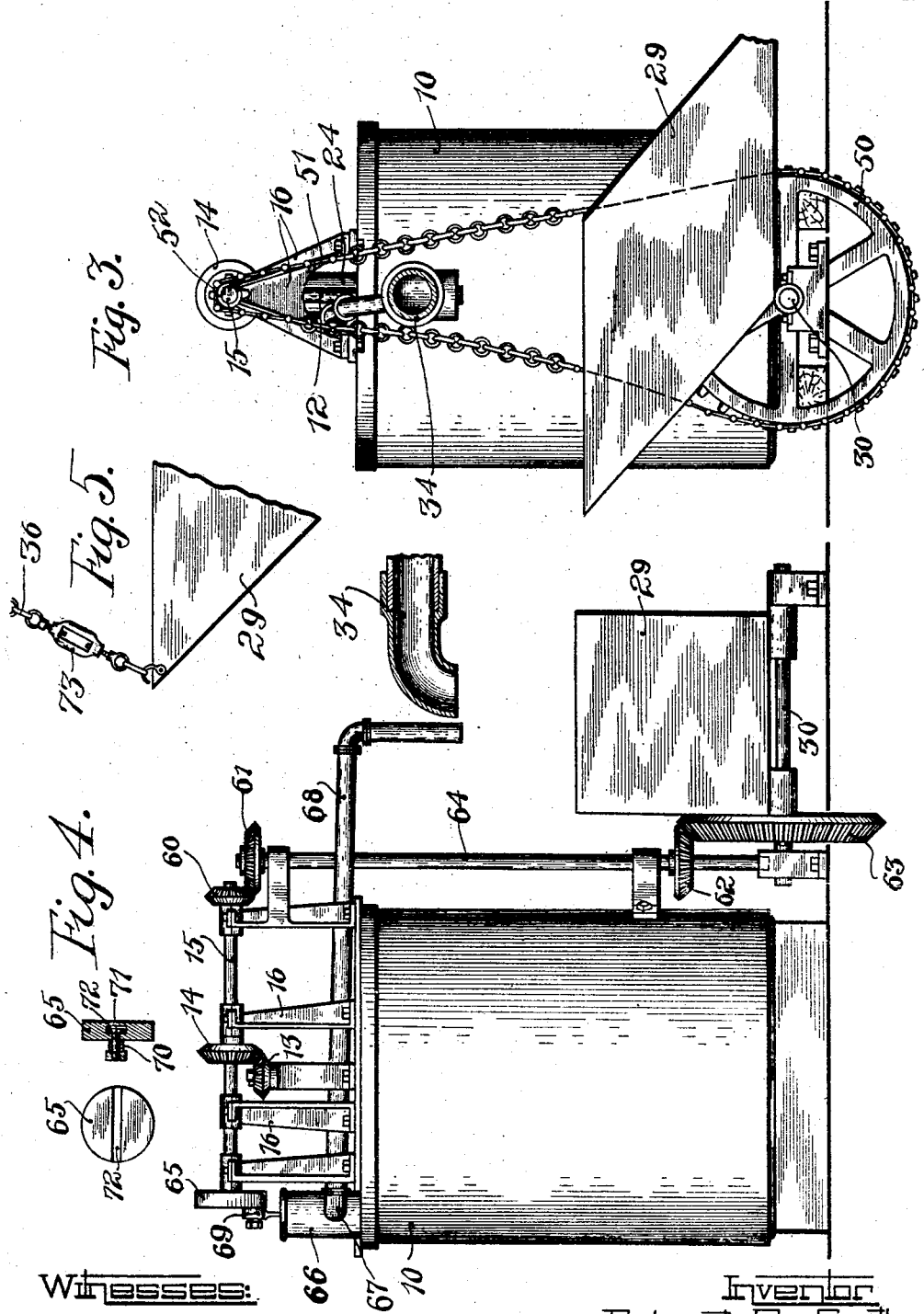

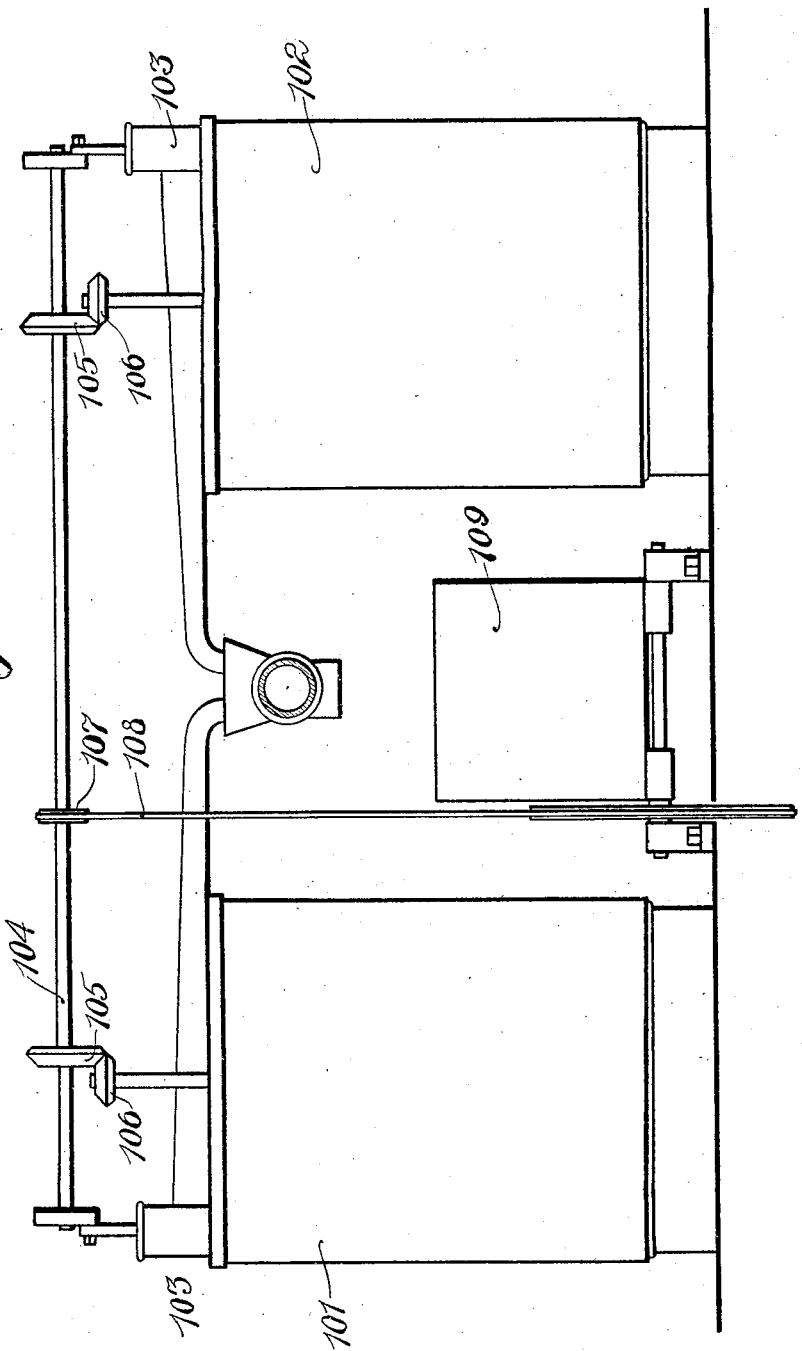

ROBERT C. SMITH, OF OAK PARK, ILLINOIS.

MIXING AND MEASURING APPARATUS.

No. 809,585.          Specification of Letters Patent.          Patented Jan. 9, 1906.

Application filed March 7, 1905. Serial No. 248,909.

*To all whom it may concern:*

Be it known that I, ROBERT C. SMITH, a citizen of the United States, residing at Oak Park, in the county of Cook and State of Illinois, have invented a certain new and useful Improvement in Mixing and Measuring Apparatus, (Case No. 1,) of which the following is a full, clear, concise, and exact description, reference being had to the accompanying drawings, forming a part of this specification.

This invention relates to a fluid mixing and measuring device which, although adapted for many purposes, is especially designed for use in connection with the purification or softening of water for the purpose of feeding steam-boilers.

The available boiler-feed water in many localities contains in solution certain salts which are acted upon by the heat of the boiler-furnace to cause an incrustation or scale upon the boiler plates and tubes. This accumulation of scale or sediment interferes seriously with the efficiency of steam generation, and it has been found profitable to treat such boiler-feed water with chemicals which cause the precipitation of sediment before the water is allowed to enter the boiler. This of course prevents the formation of scale within the boiler. The precipitation of the solid material in such impure feed-water is most efficiently accomplished when the quantity of the various chemicals added to the water is very accurately adjusted to the kind and amount of impurity in a given quantity of the feed-water. Thus upon analyzing the water in any given locality it is possible to determine the amount and kind of the chemicals which should be added to the water in order to cause the precipitation of practically all of the solid matter, which might otherwise be precipitited within the boiler itself. The results are neither economical nor otherwise satisfactory if a given quantity of water is not treated with a certain definite quantity of the chemicals to be used.

It is the object of my invention to provide an efficient yet simple and economical apparatus for automatically adding a nicely-predetermined quantity of a suitable chemical mixture to a given proportion of water.

It is a further object of my invention to provide such a combined metering and mixing machine which shall be capable of easy adjustment to meet varied conditions of service to which it may be applied and to provide a machine which can be quickly and easily assembled and dismantled.

Having stated in this way the general objects of my invention, I shall proceed to a detailed description of a preferred embodiment thereof, together with certain modifications in connection with which other objects and benefits will be pointed out or called to the attention of those skilled in the art. These embodiments of my invention are illustrated in the accompanying drawings, in which—

Figure 1 illustrates in front elevation a preferred embodiment of the machine. Fig. 2 illustrates, largely in cross-section, another view of the same machine. Fig. 3 illustrates in front elevation a machine in which certain modifications are introduced. Fig. 4 illustrates in side elevation still other modifications which may be utilized in carrying out my invention, and Fig. 5 illustrates a modification of the adjusting means of my invention. Fig. 6 illustrates in outline a modification which may be used in supplying two different chemicals from different supply-tanks.

Referring more particularly to Figs. 1 and 2, there is shown a chemical-tank 10, in which is placed the chemical mixture of a suitable kind for the required purpose, the composition of this mixture being determined by the characteristics of the feed-water which is to be purified or softened. Within this tank there is placed a set of rotary blades 11, adapted to agitate and stir the chemical mixture in order to maintain it of constant and uniform consistency and composition. These blades are carried upon the shaft 12, which is provided near its upper end with a bevel-gear 13, meshing with another bevel-gear 14, carried upon the main rock-shaft 15, this rock-shaft being carried in suitable bearings 16 16, mounted upon the top of the chemical-tank 10. The chemical-tank may be provided with a tubular channel 17, as best illustrated in Fig. 2, this channel being equipped with a float 18, which by means of a suitable cord 19 and index (not shown) may indicate the quantity of chemical mixture within the tank 10. The tank 10 is also provided with an outlet-valve 19′, which forms a means whereby the matter which may have settled on the bottom of the tank may be removed. The rock-shaft is provided with a crank 20, which is connected, by means of the rod 21, with the pump-rod 22, leading to the plunger 23, which is adapted for reciprocation within the cylinder 24 of the pump which is placed within the tank, as shown. At 25 there is a guide for the upper end of the pump-rod. The piston or plunger of the pump is provided with ball-valve 25′, a ball-valve 26 being also provided at the lower end of the pump-cylinder, these valves acting in the well-known manner to permit the upward flow of fluid within the pump-cylinder when the pump-rod is raised and lowered by means of the crank 20, the valves, however, checking and preventing the downward flow of the fluid within the pump. The pump discharges by way of a suitable spout 27 into a funnel-like channel 28, through which the chemical mixture is guided directly to one or the other compartments of a double tilting vessel 29. This tilting vessel performs the function not only of a vessel in which the boiler feed-water and the chemicals may be mixed, but also of a metering or measuring device which regulates and controls the mixture of the proper quantity of chemical with a given quantity of water. This double tilting vessel is mounted upon a shaft 30, carried in suitable bearings, and has a rotary motion limited by the spring-stops 31 and 32. A central wall 33 divides the vessel into two compartments of equal size. The water-supply pipe 34 discharges directly above the shaft 30, upon which the tilting vessel is mounted, so that the discharge is into either one compartment or the other, depending upon which of the alternate positions is occupied by the tilting vessel at the time under consideration. The shaft 15 carries the bevel-gear 14, and the crank 20 is provided at its forward end with a sprocket-wheel 35. A sprocket-chain 36 passes over this wheel and is connected at or near its ends with the extremities of the tilting vessel 29. The chain at the right-hand side of the vessel is provided with an adjustable connection, this connection comprising a slotted plate 37, attached to the chain, and a second slotted plate 38, attached to the tilting vessel itself, there being a connecting-joint 39 between the two. This joint is provided with clamping means, whereby the point of pivotal connection between the two plates may be adjusted, as desired—that is to say, the effective length of the chain 36 may be varied and also the distance from the center of the shaft 30 may be varied by shifting the position of the pin 39 in the slotted plate 38. Such a means for adjusting the length of the chain and its point of attachment with reference to a center of oscillation may be provided for both ends of the chain—that is, both the one at the right-hand side and that at the left—although in Fig. 1 I have illustrated another form of adjusting means at the left-hand side, this means consisting in a hook secured to the wall of the tilting vessel, and into which different links of the chain may be connected, as found desirable, in adjusting the length thereof. In Fig. 5 I illustrate another construction which may be employed for adjusting the length of the chain 36. It consists of a turnbuckle 73, which being interposed in the chain 36 affords means for adjusting the chain to the required length. Although it is not absolutely essential, still I have found it very satisfactory in operation to adjust the length of the chains and the points of attachment to the tilting vessel in such a way that each oscillation of the vessel will cause one complete revolution of the stroke-wheel 35, and therefore of the rock-shaft with which it is connected and to which the crank 20 and the bevel-gear 14 are also attached. By lengthening the chains the slack is such that a revolution of the stroke-wheel 35 will be somewhat less than a full revolution for each oscillation of the vessel 29. The degree of rotation of the rock-shaft 15 will be the same in each direction, however, and the rotation will be always through a given angle for each oscillation of the tilting vessel. So, also, by varying the length of the lever-arm at the extremity of which the chains are attached to the tilting vessel the amount of rotation of the rock-shaft 15 may be varied to suit the varied conditions under which it is required to operate the machine. In operating a machine of this kind I have found it satisfactory to place the entire device within a shallow vat, (not shown in the drawings,) this vat serving the purpose of catching the water and chemical mixture discharged from the two compartments of the tilting vessel, and a pipe leading from this vat serves to convey the water as desired.

The operation of the machine may be described as follows: After having determined by analysis or otherwise the character of the raw water which is to be treated the kind of a chemical mixture to be used for purifying the same may be ascertained. So, also, the exact proportion of water and chemical may be decided upon. The required chemical mixture is then placed within the tank 10, the height of the mixture being indicated by the float 18 and the associated indicating device. The raw water is fed to the tilting vessel through the pipe 34. Assuming the tilting vessel to be in the position shown in Fig. 1, the left-hand compartment is filled with water until the center of gravity of the vessel is shifted by the accumulated water to the left of the center of the shaft 30. This causes the vessel 29 to tilt or oscillate toward the left, the lower wall of the left-hand compartment moving downward until eventually it is stopped by the spring-stop 32. An intermediate position of the tilting vessel is indicated by the dotted lines in Fig. 1. During this oscillation toward the left the water is discharged from the left-hand compartment, and at the same time the right-hand compartment is brought below the discharge-pipe 34, so that the water now flows into the right-hand compartment. The downward movement of the water in the left-hand compartment during the tilting of the vessel toward the left is a source of power which by way of the chain 36 causes a counter-clockwise rotation of the sprocket-wheel 35 and the rock-shaft 15 attached thereto. It will be noted that with the tilting vessel in the right-hand position, as shown in Fig. 1, the pump-rod and piston are at the lowest point of their stroke. As the vessel tilts toward the left, causing the rotation of the sprocket-wheel, the crank 20 compasses one complete revolution, causing first the pump-rod and piston to be raised through their full stroke, thus discharging a certain amount of the chemical mixture by way of the spout 27 and the funnel 28 into the tilting vessel 29. The amount of the chemical mixture discharged for a single stroke of the pump is of course determined by the length of the stroke and the size of the pump-cylinder. After having reached the highest point in its stroke the pump-rod returns to its lowest position, as shown in Fig. 2, being assisted in its downward movement by the weight of the pump-rod and piston. The sudden downward movement of the pump-rod is checked and prevented, however, by the stirring mechanism, which is geared to the same shaft as that upon which the crank 20 is carried, thus preventing wear and tear upon the parts of the machine, especially the mechanism directly associated with the pump. As soon as the tilting vessel has shifted to the left the water is discharged from the raw-water pipe 34 into the right-hand compartment of the tilting vessel, as is also the major portion of the chemical discharged by the pump during the movement of the tilting vessel toward the left. As the right-hand compartment is filled the center of gravity of the tilting vessel is shifted toward the right until the vessel is caused to tilt toward the right, discharging again an amount of water precisely equal to that previously discharged from the left-hand compartment and causing also a clockwise rotation of the sprocket-wheel 35 and the rock-shaft attached thereto. Thus with the movement of the tilting vessel toward the right the pump-rod is carried once more through a full upward and one full downward stroke, thus discharging again an amount of the chemical mixture exactly equal to that which was discharged during the movement of the tilting vessel toward the left. The major portion of the chemical mixture discharged during this stroke is into the left-hand compartment of the tilting vessel, which is again filled by the constantly-flowing water from the discharge-pipe 34, whereupon the cycle of operations already described is indefinitely repeated.

It will be noted in connection with this device that there is but a single pump discharging first into one compartment of the tilting vessel and then into the other, the amount of chemical mixture discharged being exactly the same for each stroke of the pump, whereby a nicely predetermined quantity of the chemical mixture is mixed with a given quantity of raw water in one compartment of the vessel and then precisely the same amount of chemical mixture is mixed with the same proportion of raw water in the other compartment of the tilting vessel. This exact and uniform mixture of water and chemicals for treating the same is of the utmost importance in securing satisfactory results in the purification or softening of water for boiler-feed purposes. It will be noted also that the single pump which is used in my machine passes through two complete cycles of upward and downward strokes during each complete cycle of oscillations by the tilting vessel, and for a pump of a kind which is suitable for use in this connection the highest efficiency is secured by a comparatively frequent movement of the reciprocating parts of the pump. This is especially true when the pump is used for pumping a mixture having small particles suspended in a liquid. For example, milk of lime is very frequently used in devices of this kind. Supposing now that a pump of a kind shown in the accompanying drawings is used. It will be apparent that there will be a certain amount of sedimentation in the milk of lime during its passage through the pump-barrel and before it is discharged to the tilting vessel. This sedimentation tends to interfere with the close and accurate seating of the valves of the pump. If the valves do not seat tightly, there will be a certain amount of leakage from the pump-barrel into the tank, and the accuracy of the measurement by the measuring-pump is interfered with to the extent of this leakage through the valves. The leakage of course is not the same for each stroke of the pump, not only on account of the sedimentation of the mixture, but also on account of insoluble impurities which are frequently found in the chemicals required for commercial operation. If at certain strokes of the pump such a particle of foreign substance lodges on the valve-seat and prevents the seating of the valve, the leakage will be very much greater than at other strokes when there is no such lodgment of a foreign particle. It is therefore impossible to compensate for any leakage because the leakage is not uniform. The result is that some strokes of the pump cause the delivery of a larger quantity of chemical fluid than others. If now the period during which this leakage is likely to take place can be reduced one-half, the accuracy of measurement will be correspondingly increased. As compared with devices of the prior art this is one of the important features of my invention—that is to say, the single pump which is employed for measuring purposes is actuated with twice the rapidity of machines of the prior art. This reduces the amount of leakage when sedimentation or the lodgment of foreign particles prevents the seating of the valve. Furthermore, the passage of the mixture through the pump-barrel takes place with doubled rapidity, thereby reducing the time within which sedimentation in the pump-barrel may occur, and thus not only reducing the undesirable effect of leakage when it occurs, but also reducing one of the principal causes of leakage. Furthermore, the increased rapidity with which the mixture is passed through the pump-barrel decreases the tendency to sedimentation, thereby increasing the uniformity of the fluid as delivered from the spout of the pump to the tilting vessel.

Undue wear and tear upon the parts of the machine is to a large extent prevented by the governing influence or control which is exercised by the stirring-blades 11, which are geared without opportunity for material backlash to the rock-shaft 15, with which the other movable parts of the mechanism are all associated.

The apparatus is simple for the reason that the single rock-shaft provides the means for interconnection between all of the movable parts of the machine, the tilting vessel, the pump, and the stirring-blades all being connected mechanically with this single shaft.

It is desirable in constructing this machine to make the spout of the pump of large size and in such a position as to discharge the chemical mixture rapidly from the pump-barrel in order that the required amount of the chemical mixture may be delivered without diminution to one or the other compartments of the tilting vessel for each stroke of the pump. The arrangement of the machine invented by me is such that the rate of gearing to the stirring-blades can easily be made such that these blades will have a large degree of movement for each oscillation of the tilting vessel, this causing a very thorough stirring of the chemical mixture, thus insuring uniformity in consistency and composition.

An important feature of my invention is the means for readily adjusting the amount of chemical mixture to the amount of water delivered to each compartment of the tilting vessel by varying the length of the chains—making them longer, for instance—or by shifting their point of attachment toward the center of oscillation of the tilting vessel. The degree of revolution of the rock-shaft 15 may be decreased, but with this decrease in the degree of revolution of the rock-shaft a precise uniformity in the quantity of chemical mixture delivered for each oscillation of the tilting vessel is at once obtained, there being but one single pump. A given revolution of the rock-shaft from corresponding initial positions will always cause the delivery of the same amount of chemical mixture. The adjustment, therefore, of but a single pump-stroke is all that is required in order that the chemical mixture shall be supplied to a given proportion of water with absolute uniformity and regularity. In making this adjustment it is required only that the revolution of the crank 20 shall be through the same angular distance to either side of the vertical position. This will insure the return of the pump-rod and piston to the same initial position no matter whether the tilting vessel tilts to the right or to the left. The means illustrated in these views for accomplishing this adjustment are simple and readily accessible whereby the machine may be very easily adjusted to meet the varying conditions under which its operation may be required. It is rather more satisfactory to discharge the water and chemical mixture into the compartments of the tilting vessel through separate channels, as illustrated in the accompanying drawings, for the reason that if the chemicals are mixed with raw water in a single channel—as, for instance, in the pipe 34—before reaching the tilting vessel chemical reaction begins to take place and the inside of the water-spout is incrusted with the sediment which is formed. It is a very difficult matter to remove this incrustation when it is formed. Furthermore, the funnel 28, which preferably is carried in a suitable seat cast integrally with the elbow of the water-spout, may be easily removed and cleaned. It is sometimes desirable to decrease the size of the lower opening of the funnel, so that its discharge will be more gradual, thus causing a more gradual delivery of the chemical mixture to the compartments of the tilting vessel than would otherwise be the case, and this arrangement permits such a gradual flow to be easily accomplished, if desired.

In Fig. 3 I have illustrated a modification in which the essential difference consists in the use of a large sprocket-wheel 50, carried upon the shaft 30, upon which the tilting vessel is mounted. The rotation of the sprocket-wheel 50 with the oscillation of the tilting vessel causes a rotation of the rock-shaft, to which the pump and stirring-blades are connected by means of the chain 51 and the small sprocket-wheel 52. In this modification also the degree of rotation of the rock-shaft is the same when the tilting vessel tilts to the left as when it tilts to the right, therefore insuring a regular proportion in which the water and chemicals are mixed.

In Fig. 4 I have illustrated still another modification in which the mechanical connection between the shaft 15 and the tilting vessel is by way of the bevel-gears 60, 61, 62, and 63, the gear 63 being mounted upon the shaft 30, to which the tilting vessel is attached, and the gears 61 and 62 being carried upon the counter-shaft 64. The bevel-gear 60 is mounted upon the end of the shaft 15. The bevel-gears 13 and 14 provide the connection to a stirring mechanism, as in Fig. 2. At the rear end of the shaft 15 the crank-disk 65 is carried, and in this modification the pump 66 is arranged at the back of the chemical-tank, the discharge-spout 67 leading by way of the pipe 68 to a position to the rear of the raw-water discharge-pipe 34, both pipes being placed, preferably, directly above the shaft 30. The connecting-rod 69 is attached at its lower end, as in Fig. 2, to the pump-rod 22 and makes connection at its upper end with the sleeve 70 of a crank-stud 71, this stud being provided with a shoulder engaging a T-slot 72 in the crank-disk 65. The throw of the crank may be regulated by adjustment of the studs 71 within the slot of the crank-disk. In this way the stroke of the pump mechanism may be adjusted to discharge the required amount of chemical mixture for each oscillation of the tilting vessel.

It is often necessary to treat the water to be used with more than one chemical in order to secure the desired result. To this end I provide two machines containing different chemical solutions and working together on a single shaft. It is evident, therefore, that the two machines may discharge their chemical mixtures simultaneously into a single tipper. In Fig. 6 I have illustrated in outline such a machine employing two chemical-feed tanks, (marked 101 and 102.) Each of the tanks is supplied with a pump 103. There is a single common rock-shaft 104, which serves to actuate the pump mechanisms in both tanks. By means of the bevel-gearing 105 and 106 this rock-shaft serves also to drive the stirring mechanism of both tanks. The rock-shaft is provided with a sprocket-wheel 107, over which the sprocket-chain 108 passes, the ends of this chain being connected with the tilting vessel 109. The general construction and means for adjustment of this modification of my invention correspond with those illustrated in connection with the single-tank machines and need not be more specifically described. In this arrangement one chemical may be supplied from each tank. For instance, the tank marked 101 may be filled with lime-water and the tank 102 with solution of soda. By adjusting the two pumps the proportions of the chemicals may be varied to suit the water under treatment. So, also, the total quantity of chemical per gallon of water may be adjusted to meet the requirements.

While I have herein shown and described a preferred embodiment of my invention, together with certain modifications thereof, it will be apparent to those skilled in the art that still other changes and modifications may be made without departing from the spirit of my invention. I do not wish, therefore, to be limited to the precise construction herein set forth; but, Having described my invention, I claim as new and desire to secure by Letters Patent—

1. In a device of the class described, the combination with a tilting vessel having two compartments, of a raw-water pipe discharging into the two compartments of said tilting vessel alternately, a tank for chemical fluid, a measuring-pump for pumping chemical fluid from said tank and delivering it to said tilting vessel, a rock-shaft, a crank on said rock-shaft connected with the pump-rod of said pump, and gearing connecting the tilting vessel mechanically with said rock-shaft, the ratio and adjustment of said gearing being such as to cause an upward stroke of said pump-rod in unison with each single oscillation of said tilting vessel.

2. In a device of the class described, the combination with a tilting vessel having two compartments, of a raw-water pipe discharging into the two compartments of said tilting vessel alternately, a tank for chemical fluid, a measuring-pump for pumping chemical fluid from said tank and delivering it to said tilting vessel, a rock-shaft, a crank on said rock-shaft connected with the pump-rod of said pump, gearing connecting said tilting vessel mechanically with said rock-shaft, the ratio and adjustment of said gearing being such as to cause an upward stroke of said pump-rod in unison with each single oscillation of said tilting vessel, and means for adjusting the ratio of gearing between said tilting vessel and said pump-rod.

3. In a device of the class described, the combination with a tilting vessel having two compartments, of a raw-water pipe discharging into the two compartments of said tilting vessel alternately, a chemical-supply tank, a stirring device in said chemical-supply tank, a reciprocating measuring-pump for pumping chemical fluid from said tank and delivering it to said tilting vessel, a rock-shaft, a crank on said rock-shaft connected with the pump-rod of said pump, gearing connecting said stirring device with said rock-shaft, and gearing connecting said tilting vessel mechanically with said rock-shaft, the ratio and adjustment of said gearing being such that each single oscillation of said tilting vessel causes a predetermined upward stroke of said pump-rod.

4. In a device of the class described, the combination with a chemical-supply tank, of stirring mechanism in said tank, a tilting vessel having two compartments, a raw-water pipe discharging alternately into the two compartments of said tilting vessel, a measuring-pump for pumping chemical fluid from said supply-tank and discharging alternately into the two compartments of said tilting vessel, said pump being actuated by the movements of said tilting vessel by means of connecting-gearing serving to cause a complete up-and-down stroke of said pump in unison with each single oscillation of said tilting vessel, and gearing for connecting said tilting vessel mechanically with said stirring mechanism.

5. In a device of the class described, the combination with a chemical-supply tank, of a tilting vessel having two compartments, a raw-water pipe discharging alternately into the two compartments of said tilting vessel, and a measuring-pump for pumping chemical fluid from said supply-tank and discharging alternately into the two compartments of said tilting vessel, said pump being actuated by the movements of said tilting vessel by means of connecting-gearing serving to cause a complete up-and-down stroke of said pump in unison with each single oscillation of said tilting vessel.

6. In a device of the class described, the combination with a chemical-supply tank, of a tilting vessel having two compartments, a raw-water discharge-pipe discharging alternately into the two compartments of said tilting vessel, a single measuring-pump for pumping chemical fluid from said tank and delivering it into the tilting vessel, said pump being actuated by the movements of said tilting vessel, a gearing between said pump serving to cause both an upward and a downward stroke of said pump in unison with each single oscillation of said tilting vessel, and means for adjusting the stroke of the pump relatively to a given movement of said tilting vessel.

In witness whereof I hereunto subscribe my name this 23d day of February, A. D. 1905.

ROBERT C. SMITH.

Witnesses:
   FRANK L. GRANT,
   JESSE H. BLAIR.